US009764404B2

(12) United States Patent
Eckert

(10) Patent No.: US 9,764,404 B2
(45) Date of Patent: Sep. 19, 2017

(54) EROSION DEVICE AND EROSION METHOD FOR MACHINING HOLLOW-CYLINDRICAL WORKPIECES

(71) Applicant: Westinghouse Electric Germany GmbH, Mannheim (DE)

(72) Inventor: Marko Eckert, Birkenau (DE)

(73) Assignee: WESTINGHOUSE ELECTRIC GERMANY GMBH, Mannheim (DE)

( * ) Notice: Subject to any disclaimer, the term of this patent is extended or adjusted under 35 U.S.C. 154(b) by 244 days.

(21) Appl. No.: 14/141,688

(22) Filed: Dec. 27, 2013

(65) Prior Publication Data
US 2014/0183165 A1 Jul. 3, 2014

(30) Foreign Application Priority Data
Dec. 27, 2012 (DE) .................. 10 2012 025 373

(51) Int. Cl.
  *B23H 7/12* (2006.01)
  *B23H 7/20* (2006.01)
  (Continued)

(52) U.S. Cl.
  CPC .............. *B23H 7/20* (2013.01); *B23H 9/00* (2013.01); *F22B 37/003* (2013.01); *B23H 1/00* (2013.01)

(58) Field of Classification Search
  CPC .... B23H 7/20; B23H 9/00; B23H 1/00; F22B 37/003
  (Continued)

(56) References Cited

U.S. PATENT DOCUMENTS 2,263,412 A * 11/1941 Armentreut .......... E21B 43/112
  166/212
4,374,313 A   2/1983 Mateja et al.
  (Continued)

FOREIGN PATENT DOCUMENTS

DE   30 45 443 A1   6/1981
DE   32 04 799 A1   9/1982
  (Continued)

OTHER PUBLICATIONS

European Search Opinion Issued on Jul. 9, 2014, by the European Patent Office in corresponding European Patent Application No. 13 00 5851. (1 page).

*Primary Examiner* — David Angwin
*Assistant Examiner* — Biniam Asmelash
(74) *Attorney, Agent, or Firm* — Buchanan Ingersoll & Rooney PC

(57) ABSTRACT

An erosion device and a corresponding method are disclosed for machining a hollow-cylindrical workpiece, wherein the device is elongated and/or formed in the manner of a tube or cylinder and is characterized in that at least two rotationally acting drives (A1, A2), each with a drive shaft (AW1, AW2), and also an erosion electrode (E), interacting with the drives (A1, A2) and formed in the manner of a ring or disc, are provided. The drives (A1, A2) and the electrode (E) are adapted in size and extent to the internal diameter of the workpiece (W) to be machined, so that the device can be introduced into the respective hollow-cylindrical workpiece (W) and can be positioned at the location respectively to be machined or the region to be machined in the workpiece (W), and the erosion electrode (E) can be pivoted or can be rotated by a coupled pivoting or rotating movement of the at least two drives (A1, A2).

10 Claims, 1 Drawing Sheet

(51) Int. Cl.
  *B23H 7/18*    (2006.01)
  *B23H 9/00*    (2006.01)
  *F22B 37/00*   (2006.01)
  *B23H 1/00*    (2006.01)

(58) Field of Classification Search
  USPC .................. 219/69.11, 69.15, 69.17, 69.2
  See application file for complete search history.

(56) References Cited

U.S. PATENT DOCUMENTS

| | | | | |
|---|---|---|---|---|
| 4,476,368 A | | 10/1984 | Cammann et al. | |
| 4,484,051 A | | 11/1984 | Yamada et al. | |
| 5,086,201 A | * | 2/1992 | Grypczynski | B23H 9/00 |
| | | | | 219/69.17 |
| 5,317,607 A | * | 5/1994 | Formanek | B23H 9/00 |
| | | | | 219/69.2 |
| 5,408,883 A | * | 4/1995 | Clark, Jr. | B23H 9/00 |
| | | | | 29/33 T |
| 5,543,599 A | * | 8/1996 | Cole | F22B 37/003 |
| | | | | 219/69.17 |
| 5,861,608 A | * | 1/1999 | Thompson | B23H 9/005 |
| | | | | 219/69.11 |
| 5,897,793 A | * | 4/1999 | Chavez | B23H 9/001 |
| | | | | 219/69.17 |
| 6,353,199 B1 | * | 3/2002 | Hosaka | B23H 1/00 |
| | | | | 219/69.11 |
| 6,459,063 B1 | * | 10/2002 | Okazaki | B23H 7/26 |
| | | | | 219/69.2 |
| 6,566,623 B2 | * | 5/2003 | McPhillips | B23H 7/12 |
| | | | | 219/69.17 |
| 6,626,074 B1 | | 9/2003 | Wheeler | |
| 6,881,918 B2 | * | 4/2005 | Miyake | B23H 7/26 |
| | | | | 219/69.2 |
| 2005/0016965 A1 | * | 1/2005 | Miyake | B23H 7/26 |
| | | | | 219/69.2 |
| 2007/0246372 A1 | * | 10/2007 | Obara | B23H 3/04 |
| | | | | 205/662 |
| 2014/0183165 A1 | | 7/2014 | Eckert | |

FOREIGN PATENT DOCUMENTS

| | | |
|---|---|---|
| DE | 4421246 C1 | 11/1995 |
| DE | 10 2012 025 373 A1 | 7/2014 |
| FR | 2 591 922 A1 | 6/1987 |
| JP | 07-051947 A | 2/1995 |
| JP | 2001-018125 A | 1/2001 |

\* cited by examiner

EROSION DEVICE AND EROSION METHOD FOR MACHINING HOLLOW-CYLINDRICAL WORKPIECES

RELATED APPLICATION

This application claims priority under 35 U.S.C. §119 to German Patent Application No. 10 2012 025 373.7 filed in Germany on Dec. 27, 2012, the entire content of which is hereby incorporated by reference in its entirety.

FIELD

The present disclosure relates to an erosion device and an erosion method for machining hollow-cylindrical workpieces, with which geometrical forms can be introduced into hollow-cylindrical workpieces, such as for example pipes or lines, particularly those fitted in a nuclear plant or reactor system, or these workpieces can be separated or cut off or cut into while in the fitted or installed state.

In nuclear plants, and in particular in the case of pressurized water reactors, the high level of stress on the heating tubes that form the interface between the primary circuit and the secondary circuit, that is the water-steam cycle in a nuclear power plant with a pressurized water reactor (PWR), and the heat exchange taking place between the two circuits by the heating tubes, can cause corrosive damage to the walls of the tubes. If the damage continues to develop undetected during power generating operation, this can lead to penetration of the wall, and possibly the formation of cracks, the differential pressures prevailing in the two circuits having the effect that the damage to the wall can lead to a transfer of the primary coolant into the water-steam cycle and, as a consequence, can also lead to contamination of the secondary circuit. Accordingly, such damage is nevertheless damage with safety implications that can certainly lead to a nuclear accident. However, early identification of the imminent damage to the pipeline system, and consequently identification in time—before the occurrence of a leakage described above—cannot be carried out and ensured sufficiently by known methods of nondestructive testing.

Bearing in mind the facts described, the issues occurring with increasing frequency in nuclear plants mean that repairs of the damaged areas and locations, and operations involving material being removed from them, are carried out in the steam generators (primary heat exchangers), and in particular in the respective pipeline system, at more or less regular time intervals, but, because of the external conditions, it can be extremely difficult to investigate and discover the mechanisms that give rise to the problems or the causes of the corrosive damage. Because of the comparatively high radiation exposure, and consequently the comparatively high potential risk, for operating personnel of the nuclear plant, the respective sections of line and pipe have to be removed in a mechanized and/or automated manner. On account of the complexity of the pipeline systems, and accordingly restricted accessibility, known separating methods, such as for example mechanical separation applied from the outside in a way similar to pipe cutting in heating engineering, in which work is carried out from the outside to the inside, can only be used to a limited extent. Moreover, machining involves comparatively high moments/forces introduced into the device, and consequently into the workpiece. However, the surrounding geometry, in particular here in the heat exchanger of a nuclear power generating plant, can mean that there are long distances together with numerous bends of the pipelines and also small internal diameters, and consequently only very restricted spaces. This can lead to instances of inaccessibility and material fatigue through to rupturing of the drive shafts of the mechanical cutting or separating device.

Other methods also come into consideration for the machining of the pipeline system and implementation of the repair measures, such as for example the MDM method for carrying out separating work, which differs technologically from EDM and in which material is removed by means of current erosion.

The MDM method is likewise a kind of EDM method, the only difference being that the work is not contactless. The electrode is rotated in the tube and is sometimes in contact sometimes not. When it is in contact, material is removed by local melting. When there is a certain distance, a plasma is also built up, but is not switched off by the EDM control but instead interrupted by further rotation of the electrode, and consequently an increase in the distance between the electrode and the workpiece.

This method is therefore not suitable for ascertaining the state of erosion and/or the progress of erosion. This kind of erosion is not controllable, since there is no feedback in the form of controlled variables, so that, due to its lack of controllability, this method tends not to be suitable for removing material stage by stage in a directed and defined manner.

Accordingly, there are increasingly frequently issues concerning the controllability of the method, and with regard to the implementation time, which can be too long or is subject to comparatively great fluctuations. In terms of the method, it can also only be ensured with difficulty, or cannot be ensured at all, that neighbouring components are not damaged during implementation.

One, and in many cases the only, and simplest possibility for access is offered or thereby provided by the pipeline system itself.

Accordingly, DE 4421246 C1 discloses a device for die sinking of electrically conducting workpieces by EDM methods.

Electro-erosion (EDM—Electrical Discharge Machining) or erosion is a machining method that is used for producing dies and geometrically shaped objects and for machining electrically conducting workpieces, every electrical discharge that is generated between an electrode and a workpiece in the machining zone causing a crater to be formed in the workpiece (material removal) and a burning away to occur on the electrode (consumption of the tool electrode). The respective electrode, such as a replenishable wire, can in this case be inclined between different angular positions, so that in this way workpieces with tapers or with for example different profiles on an upper side and underside of the workpiece can be produced and machined. The machining of the workpiece in this case can take place from the outside to the inside.

During the actual machining of the respective workpiece, the electrode used is not at any time in mechanical contact with the workpiece to be machined, and it therefore imposes particularly a little stress on the workpiece.

As already stated above, there is also the issue that, in complex systems and technical plants, such as for example in the chemical industry and related plants, and also in nuclear plants, many locations are often only accessible and reachable via the line system itself.

In the case of the device disclosed by DE 4421246 C1, at least one formed electrode tool that can be displaced in the direction of the erosion movement by a movement of a drive means taking place perpendicularly thereto is used.

As a result, die sinking is made possible even in spatially confined conditions, such as between two plates lying opposite one another, since the erosion movement taking place perpendicularly to the surface can be transferred from the outside through a movement taking place perpendicularly thereto. Provided in this case as the drive means is an axially displaceable erosion rod, which is conically shaped at the part thereof that is in operative connection with the formed electrode tool. The formed electrode tool is mounted by at least one guide pin in a hollow main body, which receives the end of the erosion rod provided with a conical lateral surface, the guide pin being mounted on this conical lateral surface. Also provided are means such that, when the erosion rod is moved back, a return of the formed electrode tool is brought about. Instead of just one erosion electrode, it is also possible to provide two formed electrode tools which are displaceable with respect to one another and in directions opposed to one another, so that geometrical forms or apertures can be die-sunk in two oppositely parallel surfaces at the same time.

The aforementioned device has in this case a comparatively complex, and consequently also relatively elaborate, care-intensive and fault-prone mechanism, which moreover necessitates or has a spatially extensive structure and construction, so that use in pipes or lines with a comparatively small diameter may not be possible.

At the same time, as a result of the temperature transfer, there may also be deformations of and unwanted damage to the workpiece to be machined to the left and right of the machining region, or in front of and behind the respective electrode, depending on the weight distribution of the workpiece to be machined, in particular when capping hollow-cylindrical workpieces.

In addition, in the case of a fitted workpiece, in particular a line or a pipe, once it has been brought into operation or put into operation, it may only be accessed with difficulty, or not at all, from the outside, that is to say from outside the workpiece, so that the only way in which machining could come into consideration or could be carried out at all is from the inside to the outside.

Furthermore, in particular in the case of workpieces with a small internal diameter, there is generally the issue that exact machining of the workpiece in the interior space is greatly hindered, to the point of not being possible, on account of the small amount of space available, and the erosion electrode cannot be introduced in a directed manner into the workpiece and moved in the workpiece.

SUMMARY

An erosion device is disclosed for machining a hollow-cylindrical workpiece, which device is elongated and/or formed in the manner of a tube or cylinder, comprising: at least two rotationally acting drive means (A1, A2), each with a drive shaft (AW1, AW2); an erosion electrode (E), interacting with the drive means (A1, A2) and formed in the manner of a ring or disc, wherein the at least one first (A1) and second (A2) drive means and/or axes of symmetry or axes of rotation (D1, D2) thereof are arranged radially or laterally offset in relation to one another and the second drive means (A2) is connected eccentrically and frictionally to the drive shaft (AW1) of a first drive means (A1) and/or is arranged thereon and/or coupled thereto, and the erosion electrode (E) is eccentrically and frictionally connected to the drive shaft (AW2) of the second drive means (A2) and arranged thereon and/or coupled thereto; wherein the drive means (A1, A2) and the electrode (E) are adapted in size and extent to an internal diameter of a hollow-cylindrical workpiece (W) to be machined, so that the device can be introduced into the workpiece (W) and can be positioned at a location to be machined or a region to be machined in the workpiece (W); and wherein the erosion electrode (E) is configured to be pivoted or to be rotated by a coupled pivoting or rotating movement means of the at least two drive means (A1, A2), into material of a walling of a workpiece (W) and to be moved through or along the workpiece (W) and/or the material of the walling thereof on a predeterminable machining path which follows an inner and/or outer contour of the workpiece, so that removal of material and/or cut in material of the wall of the workpiece (W) can be performed by EDM.

BRIEF DESCRIPTION OF THE DRAWINGS

The further description of the invention as well as advantageous refinements and developments is provided on the basis of a number of figures and an exemplary embodiment.

In the figures.

For more detailed explanation of the invention, exemplary embodiments are described and explained in more detail on the basis of the accompanying figures, the same parts being provided with the same reference signs in all the figures.

DETAILED DESCRIPTION

Figures 1, 2:
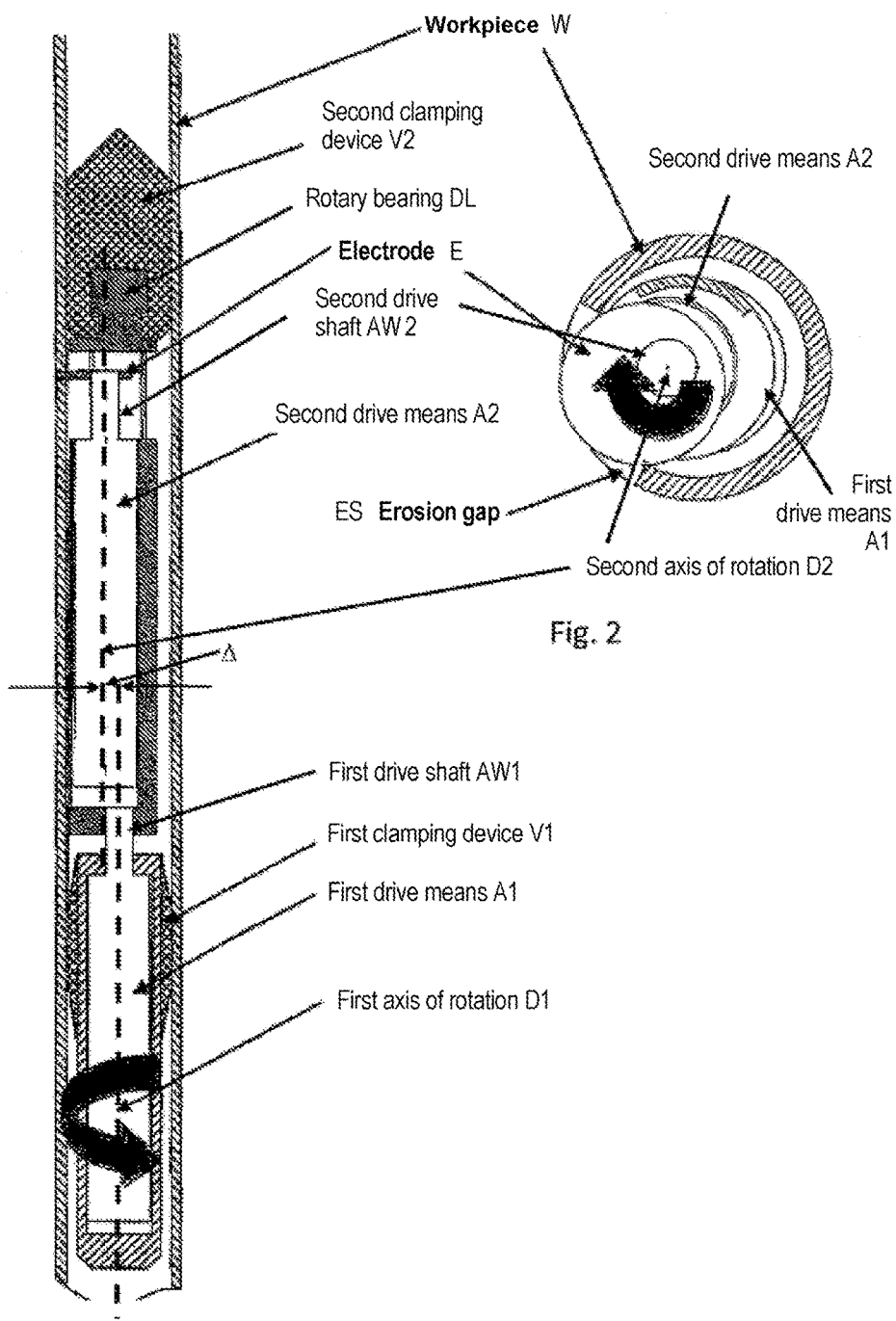
FIG. 1 shows an exemplary erosion device according to the present disclosure, formed by way of example, in longitudinal section and in the state of being clamped in the workpiece.
FIG. 2 shows the erosion device according to FIG. 1, formed by way of example, in plan view of the erosion electrode and with the electrode in the plunge cut.

An improved possibility is disclosed for the machining and separating of fitted or installed pipes and pipelines of a nuclear plant or reactor system, and in particular a pressurized water reactor.

An erosion device is disclosed for machining hollow-cylindrical, in particular tubular workpieces, the device being able to be introduced into the interior of the workpiece and positioned there and then working away and/or removing the material of the workpiece from the inside to the outside by EDM methods. Advantageous refinements and developments of the erosion device and a corresponding method are provided in the description which follows.

An erosion device according to the present disclosure for machining a hollow-cylindrical workpiece is elongated and/or formed in the manner of a tube or cylinder and is characterized in that at least two rotationally acting drive means, each with a drive shaft, and also an erosion electrode, interacting with the drive means and formed in the manner of a ring or disc, are provided, wherein at least a first and a second drive means and/or the axes of symmetry or axes of rotation thereof are arranged radially or laterally offset in relation to one another and the second drive means is connected eccentrically and frictionally to the drive shaft of the first drive means and is arranged thereon and/or coupled thereto, and the erosion electrode is eccentrically and frictionally connected to the drive shaft of the second drive means and arranged thereon and/or coupled thereto, wherein the drive means and the electrode are adapted in size and extent to the internal diameter of the workpiece to be machined, so that the device can be introduced into the respective hollow-cylindrical workpiece and can be positioned at the location respectively to be machined or the region to be machined in the workpiece, and the erosion electrode can be pivoted or can be rotated by means of a coupled pivoting or rotating movement of the at least two drive means into the material of the wall or walling of the workpiece and can be moved through or along the workpiece and/or the material of the walling on a machining path following the inner and/or outer contour of the workpiece, and wherein a removal of material and/or cut in the material of the wall of the workpiece can be brought about and/or can be produced along the machining path or path of movement by means of EDM methods.

In a further refinement, it is provided that the axis of rotation of the first drive shaft corresponds to the axis of symmetry of the first drive means and the axis of rotation of the second drive shaft corresponds to the axis of symmetry of the second drive means, wherein the second drive means is arranged in such a way that the axis of rotation and symmetry thereof is located outside the centre axis of the hollow-cylindrical workpiece, and in particular of the pipe to be machined, or is arranged and/or aligned laterally or radially offset in relation thereto.

In this case, the drive means and electrode advantageously interact in such a way that the electrode can be pivoted into the workpiece to be machined and can be moved, in particular can be rotationally moved, through the workpiece, and in particular the material of the shell or wall thereof, on a predeterminable machining path, in particular on or in a primarily circular path.

As a development, it can be provided that the diameters of the at least two drive means or drive devices and of the erosion electrode are adapted to the clear width or the internal diameter of the hollow-cylindrical workpiece to be machined, in particular the internal diameter of a line or a pipe of a nuclear reactor system.

It is of particular advantage in this case that the diameter or the external diameter of the second drive means or of the second drive device can be chosen to be less than the diameter of the first drive means or the first drive device, so that, with a given radial offset, the second drive means can be covered by the first drive means and/or the second drive means can be pivoted and/or can be rotated by 360° in the hollow-cylindrical workpiece on account of or in spite of the eccentric coupling thereof to the first drive means.

As a development, the diameter of the erosion electrode is formed such that it is smaller than or the same size as the diameter of the first drive means.

The respective drive means can in this case be formed as an electromechanical drive, in particular as a stepping drive or motor or servo drive and/or rotary drive, or as a hydraulic drive or as a pneumatic drive, wherein step-down gear mechanisms can be additionally provided, in order to achieve and bring about a suitable movement, and in particular movement control. It is also entirely possible for a combination of different types of drive to be realized and provided.

On account of the particular arrangement and alignment of the drive means and the electrode, greater stiffnesses of the arrangement as a whole can be achieved in comparison with known arrangements as a result of the comparatively small lengths of the drive shafts with a comparatively small and compact type of construction, and consequently particularly stress-free and exact machining of the respective workpiece is made possible and can be brought about.

An erosion device according to the present disclosure in this case advantageously makes it possible to cut off or cut into a hollow-cylindrical workpiece, in particular a line and/or a pipe, in particular with a circular or elliptical cross section, from the inside to the outside, and consequently also to machine difficultly accessible regions of the respective hollow-cylindrical workpiece, and in particular of a pipe or a line of a reactor system or nuclear plant.

The erosion device, and in particular the dimensions of the drive means or drive devices and also of the electrode are in this case adapted to one another and the respective hollow-cylindrical workpiece, and in particular the internal diameter or clear width thereof, in such a way that the erosion device can be smoothly inserted into the hollow-cylindrical workpiece, in particular a pipe or a line, and/or can be moved therein, in particular can be displaced and/or can be positioned at the location to be machined.

The positioning of the erosion device may be brought about for example by means of a hydraulic propulsion acting in the longitudinal direction, for example by means of hydraulic nozzles through which a liquid jet is driven at a comparatively high pressure and the repulsion of which then propels the device.

It can advantageously also be provided that the erosion device is brought or fired to the respective place of use and/or positioned there by means of a liquid or gas jet passed through the workpiece.

As a development, it can be provided that the erosion device can be guided and can be recovered from the workpiece by means of a wire cable fastened to it.

For propulsion over relatively small distances, and consequently a movement of the electrode in the longitudinal direction or in the axial direction, a further drive means can be provided, for example a servo drive or stepping drive with a spindle, which is connected between the second drive means or the shaft thereof and the erosion electrode and with which a longitudinal movement just of the electrode can be brought about, without the entire erosion device having to change its position.

A further issue that has been recognized is the deformation of the workpiece to be machined by the erosion process and the heating up of the respective workpiece, with at the same time unequal load distribution. In order to keep the erosion process stable up to the end, and avoid the aforementioned issues and effects, the erosion device should be clamped in the workpiece to be machined, this clamping having to take place on both sides of the machining or erosion location or of the erosion gap, and in particular of the erosion electrode.

This means that, for example when cutting off or separating a pipe or a line, the clamping of the erosion device in the interior of the pipe not only takes place in the part to be cut off but also in a part of the connection piece or pipe that still remains. If the clamping of the erosion device takes place only on one side of the electrode or the erosion location, jamming of the electrode, and possibly deformation of the workpiece, may otherwise occur, in particular towards the end of the separating operation, on account of the removal of material that has already taken place, whereby the process is unnecessarily drawn out and exact machining is made virtually impossible.

As a development, it can be provided that the erosion device has at least two clamping devices, which are arranged on both sides, in the longitudinal direction, of the erosion electrode, and consequently of the actual machining region or already created erosion gap, and keep the erosion device, and also in particular the drives or drive means and the electrode, immovably fixed in the workpiece in the longitudinal direction or axial direction and clamped thereto, so that deforming of the workpiece by the machining process, and consequently jamming of the electrode during the erosion operation, and in particular in the end phase of the erosion process, are avoided, and consequently exact and trouble-free working, in particular separating, can be brought about and/or is ensured.

The respective clamping device may in this case be hydraulically formed, wherein at least one cushion that can be filled with a gas or liquid can be provided, which cushion expands in the workpiece when filled with the gas or the liquid until clamping of the first and/or second drive means connected to it in the hollow-cylindrical workpiece has been brought about.

In a further refinement, the respective clamping device may also have corresponding clamping jaws, in particular three or more clamping jaws, which are for example electromechanically pressed radially outwards when required, until the device is securely clamped and held in the workpiece.

As a development in this respect, supply lines can be provided, by or via which the erosion device is supplied both with electrical energy and with gas or liquids, for example for the clamping devices, and/or with a dielectric for flushing the erosion gap or the erosion location and/or carrying out the actual EDM method.

A first clamping device is in this case rigidly connected to the first drive means and a further, second clamping device is connected rotationally movably to the shaft of the first drive means and/or the second drive means, in particular via a rotary bearing and a spindle or a shaft or a web.

In the longitudinal direction or axial direction of the erosion device, the two clamping devices and also the drive means and the erosion electrode are consequently frictionally connected and/or coupled to one another.

In an advantageous refinement, the erosion device also can include a control device with which the EDM process can be precisely and effectively controlled and monitored, wherein the EDM process, and consequently for example also the machining and/or separating of a hollow-cylindrical workpiece, and in particular a pipe or a line, is brought about and/or carried out from the inside to the outside.

As a development, it can be provided that at least one measuring or sensor arrangement is provided, by which the progress and/or progression and/or the control of the respective machining or separating process, and in particular the successful through-cut, can be determined and/or can be sensed, wherein the sensing and/or determination can be carried out and/or is carried out on the basis of EDM parameters, such as for example current, voltage, removal rate, and proportion of the active pulses, or purely visually, by means of optical monitoring devices, such as for example a camera, and/or by the changing of the natural frequency of the workpiece, in particular the pipe or the line, and/or by the eddy current method.

In the case of what is known as the eddy current method, a variable magnetic field is generated by means of a coil and induces in the material to be investigated eddy currents which, for their part, generate a variable magnetic field, which is directed counter to the excitation field. In the respective measurement the resultant overall field or the change in the overall field is detected by means of a sensor arrangement with a sensor. In this respect, parameters such as the amplitude and the phase shift with respect to the excitation signal are sensed by means of a further measuring coil in the sensor arrangement. As an alternative to this, other customary magnetic field sensors, such as for example GMR sensors (sensors for the determination of the giant magnetoresistance) or SQUIDs (superconducting quantum interference devices) can also be used.

Eddy current testing makes use of the effect that thickness variations in an electrically conductive material also comprise a variation of the electrical conductivity or a changed permeability with respect to the actual material thickness.

Since the measuring signal is determined by the three parameters, conductivity, permeability and the distance between the detector and the surface of the material, differences in the material thickness, and consequently also the removal of material or the degree and progression of the removal of material by means of the EDM method can also be sensed and determined by means of eddy current testing.

For controlling and monitoring both the erosion process and/or separating process and in particular the drive means respectively used, a control device can be advantageously provided, which device interacts with various measuring devices and sensor arrangements and/or makes possible and allows a remote or distant control of the erosion device and also of the actual erosion process via interfaces and operating elements provided for this.

The drive of both the drive shafts of the drive devices or drive means should take place in a controlled manner, in order to be able to carry out the machining process in a monitored and exact manner, which can be brought about for example by stepping motors and corresponding step-down gear mechanisms.

Furthermore, it can be provided that at least one measuring and/or sensor device is provided, wherein the determination and evaluation of the angular positions and movement control of the drive units of the drive shafts and also of the electrode can be carried out by means of known measuring devices and measuring means, such as rotary transducers or angular position transducers, such as for example encoders, resolvers, incremental encoders, potentiometer pickoffs, absolute encoders, tachometers and the like, or a combination thereof.

Furthermore, an erosion method is disclosed, in particular a die sinking method, for machining hollow-cylindrical workpieces, and in particular pipes or lines of a nuclear plant or a reactor system, wherein at least one erosion device of the type described above is brought or moved to the region to be machined, in particular the region to be separated, and/or the predetermined separating location, through the respective hollow-cylindrical workpiece, in particular the pipe or the line, and is positioned there in such a way that the machining and/or separating process can be dependably carried out by means of EMD methods, and process- or machining-dependent deformation of and/or damage to the respective region of the pipe or line is avoided, or at least minimized, by the erosion device being clamped such that it is immovably fixed in the hollow-cylindrical workpiece, in particular immovably fixed in the axial direction or in the longitudinal direction, by means of two clamping devices at at least two locations, to be specific respectively in front of and behind the respective machining location and/or the respective erosion gap, and the erosion electrode being pivoted by means of at least two, in particular coupled pivoting movements into the walling of the workpiece and being moved through the material of the wall or walling or along on the material of the walling on a predeterminable machining path, which in particular is adapted to and/or follows the inner or outer contour of the workpiece.

Accordingly, it can be advantageously provided that the erosion device is clamped at at least two locations, to be specific respectively in front of and behind the machining location or the erosion gap being formed in the hollow-cylindrical workpiece, and the erosion electrode is pivoted by means of at least two pivoting movements into the walling of the workpiece and is moved through the material of the wall or walling of the workpiece or along the material of the walling on a predeterminable machining path, in particular following the inner or outer contour.

In terms of the method, it is consequently possible, after the erosion device has been positioned at the location to be machined of the respective hollow-cylindrical workpiece, for a predeterminable region to be separated or cut out from the respective hollow-cylindrical workpiece, here a pipe or a line of a nuclear plant, by means of the aforementioned device. Before the actual machining or separating operation, to avoid or at least minimize process- or machining-dependent instances of deformation and/or damage of or to the respective region of the pipe or line, clamping is performed at at least two locations in the workpiece, in particular in the pipe or in the line, and in particular on both sides of the machining region and/or the separating or cutting line.

As a development, it is provided that the erosion electrode can be plunged or can be pivoted into the material of the wall of a hollow-cylindrical workpiece to a predeterminable depth by means of two coupled rotating movements and is moved or pivoted through the workpiece one or more times on a path of movement adapted substantially to the outer contour and/or the inner contour.

It can advantageously also be provided that the two coupled rotating movements can be performed independently of one another, that is to say with two independently activatable drive means, whereby quite different machining steps and cuts can be brought about and the following cutting possibilities are obtained, wherein a) a complete plunge cut through the walling of the workpiece or walling of the pipe and then the subsequent axial circumferential cut can be carried out, or b) an axial cut with an infeed in the radial direction can be carried out, wherein the radial infeed can be brought about or can be carried out continuously, so that the cutting line ultimately resembles a spiral, or c) an axial cut with an infeed in the radial direction can be carried out, wherein the radial infeed is brought about on the basis of certain angles, wherein a complete circumferential cut, such as in particular an angular cut of 360°, is always carried out with the same or identical external diameter and the depth of the plunge cut is only made greater or further increased after the respective circumferential cut, so that the removal takes place essentially by layers or in multiple layers, or d) a complete plunge cut through the walling of the workpiece or walling of the pipe can be carried out and the cut can consequently first be brought about completely in the radial direction, wherein then a moving-out operation, a turning in the axial direction and then again a plunge cut take place, or can be carried out or can be brought about, as before, or e) a combination of a number of cutting possibilities specified under a) to d) can be carried out and can be brought about, such as in particular a complete plunge cut and a then-following spiral cut.

Furthermore, it can be provided that the identification and detection of the complete through-cut is carried out in at least one or a combination of the ways specified below, wherein a) in the case of the known burning away, the depth of the plunge cut, as a function of the angle of rotation and electrode size, or in the case of a ring or disc electrode the electrode radius or diameter, can be determined by the respective angle of rotation, which can be sensed and determined, in particular can be measured, by a suitable measuring means, in particular rotary transducer or angular position transducer, on the respective drive means, b) the plunging depth and/or the through-cut can also be determined by means of measuring methods, such as ultrasonic measurement or eddy current measurement, c) the plunging depth and/or the through-cut can be sensed by the change in frequency of the workpiece, in particular when the through-cut has taken place, d) the plunging depth and/or the through-cut can be sensed by an imaging method, in particular by means of an endoscope or a camera arranged on the erosion device, e) the plunging depth and/or the through-cut can be determined and can be detected by analysis of the erosion parameters, since in particular the current flow changes significantly when there is a successful through-cut.

As already indicated at the beginning, issues occurring in nuclear plants, in particular in the steam generators (primary heat exchangers), which are used as a separating element of the primary circuit from the secondary circuit, mean that repairs are also involved and carried out with increasing frequency.

In order to be able to clarify the mechanisms that give rise to the issues or the causes of the issues that have occurred or are occurring, samples can have to be taken from the places where these pipes are damaged, the high radiation exposure, and consequently a comparatively high potential risk, for operating personnel of the nuclear plant meaning that the respective sections of line or pipe have to be removed in a mechanized and/or automated manner.

The exemplary erosion device according to the present disclosure, shown in FIGS. 1 and 2 and formed by way of example, is intended and can be used for this.

In FIG. 1, an erosion device according to the present disclosure, formed by way of example, for machining, and in particular separating, a hollow-cylindrical workpiece is shown in a sectional representation as a longitudinal section, the erosion device shown being clamped in an installed or fitted pipe or a line of a reactor system, in particular a reactor system that is in operation.

The erosion device is in this case elongated and/or formed in the manner of a tube or cylinder and has two rotationally acting drive means A1, A2, in the example shown here two electric rotary drives in the manner of servo motors, each with a drive shaft AW1, AW2, and also an erosion electrode E, interacting with the drive means and formed in the manner of a ring or disc. It should be emphasized in particular here that the first drive means A1 and the second drive means A2 and/or the axes of symmetry or axes of rotation D1 and D2 thereof are aligned and arranged radially or laterally offset in relation to one another by a predeterminable distance Δ, wherein the second drive means A2 is connected eccentrically and frictionally to the drive shaft AW1 of the first drive means A1 and is arranged thereon. Consequently, the second drive means A2 is formed such that it can be rotated by at least 360° in an electromotive and/or electromechanical and automated manner by means of the first drive means A1. Advantageously, multiple 360° rotations or fully circular rotations may also be performed, or else only part-circular rotating movements, it being possible when using a corresponding stepping or servo drive for both continuous rotating movements and stepped rotating movements to be carried out or performed.

Furthermore, the erosion electrode E provided for performing the actual EDM process is frictionally connected to the drive shaft AW2 of the second drive means A2 and eccentrically arranged thereon. Accordingly, the erosion electrode E is formed such that it can be rotated by, for example, at least 0 to 180° in an electromotive or electromechanical and automated manner by means of the second drive means A2. Advantageously, both continuous rotating movements and stepped rotating movements can also be carried out or performed in this case when using a corresponding stepping or servo drive.

Furthermore, the drive means A1, A2 and the electrode E are adapted in size and extent to the internal diameter of the workpiece W to be machined, so that the erosion device can be introduced into the respective hollow-cylindrical workpiece W smoothly and without any great resistance and can be positioned at the location respectively to be machined or the region to be machined in the workpiece W. In the example shown here, the diameter or the lateral width or extent of the second drive means A2 is therefore chosen to be less than that of the first drive means A1, and that of the erosion electrode E is chosen to be less than or equal to that of the first drive means A1. This can be seen very clearly from FIG. 2 in particular.

Consequently, the erosion electrode E can be pivoted or rotated by means of a coupled pivoting or rotating movement of the two drive means A1 and A2 into the material of the walling of the workpiece, wherein initially an erosion gap ES is formed by means of the EDM process, as can be seen in FIG. 2. Furthermore, the electrode E can be moved through or along the workpiece W and/or the material of the walling or wall of the workpiece on a predeterminable path, and in particular on a machining path following the inner and/or outer contour of the workpiece W. The removal of material and gap-forming process may in this case be brought about in multiple steps or passes, as it were layer by layer, in particular for as long as it takes until a penetration through the wall of the workpiece is brought about.

It is also provided that the axis of rotation of the first drive shaft AW1 corresponds to the axis of symmetry of the first drive means A1 and the axis of rotation of the second drive shaft AW2 corresponds to the axis of symmetry of the second drive means A2.

The drive means A1, A2 and the electrode E in this case advantageously interact in such a way that the electrode E can be pivoted into the workpiece W to be machined and can be moved, in particular can be rotationally moved, through the hollow-cylindrical workpiece W, and in particular the material of the shell or wall thereof, in particular on or in a path that is primarily circular in the example shown here.

Even though the drive means A1, A2 indicated in the example shown here are formed as an electric drive and/or an electric rotary drive or an electromechanical servo or stepping drive with a suitable step-down gear mechanism, these drive means, or else just at least one drive means, may in principle also be formed as a hydraulic drive or as a pneumatic drive.

On account of the particular arrangement and alignment of the drive means A1, A2 and the electrode, great stiffnesses of the arrangement as a whole can be achieved in comparison with known arrangements as a result of the comparatively small lengths of the drive shafts AW1, AW2 with a comparatively small and compact type of construction, and consequently particularly stress-free and exact machining of the respective workpiece W is made possible and can be brought about.

An erosion device according to the present disclosure in this case advantageously makes it possible to cut off or cut into a hollow-cylindrical workpiece W, in particular a line and/or a pipe, in particular with a circular cross section, from the inside to the outside, and consequently also to machine regions of the workpiece W that are difficult to access from the outside, wherein the actual machining can be carried out in multiple steps and/or passes. As shown in FIG. 2, here by way of example a partly circular region of the workpiece to be machined has already been exposed or cut through and an erosion gap ES has formed, the electrode E having plunged into the gap.

The erosion device, and in particular the dimensions of the drive means A1, A2 or drive devices and also of the electrode E, are in this case adapted to one another and the clear width or the internal diameter of the hollow-cylindrical workpiece W to be machined, so that the erosion device can be smoothly inserted into the hollow-cylindrical workpiece, in particular a pipe or a line of a nuclear plant or a chemical production plant, and/or moved therein, in particular can be displaced and can be positioned.

To avoid deformation of the workpiece W to be machined as a result of the erosion process or separating process, in order to keep the respective erosion process stable up to the end, clamping devices V1, V2 are provided, with which the erosion device can be clamped in the workpiece W to be machined and/or can be positioned exactly in place and immovably fixed. This clamping takes place in this case on both sides of the machining location or region or erosion location or region or of the respective erosion gap ES, and in particular of the erosion electrode E, so that, for example when cutting off or separating a pipe or a line, the clamping of the erosion device in the interior of the pipe has been or is brought about not only in the part to be cut off but also in a part of the connection piece or pipe that still remains.

If, however, the clamping of the erosion device accordingly takes place only on one side of the electrode E or the erosion location, jamming of the electrode, and possibly deformation of the workpiece, may occur, in particular towards the end of the separating operation, on account of the removal of material that has already taken place, whereby the process would be unnecessarily drawn out and exact machining made virtually impossible.

In the example shown here of FIG. 1, the erosion device has two clamping devices V1, V2, which are arranged on both sides of the erosion electrode E in the longitudinal direction and keep the device, and also in particular the drives or drive means A1, A2 and the electrode E, axially immovably fixed in the workpiece and clamped thereto, so that deforming of the workpiece W by the machining process, and consequently jamming of the electrode E during the erosion operation, and in particular in the end phase of the erosion process, are avoided, and consequently exact and trouble-free working, in particular separating, can be brought about and/or is ensured.

The respective clamping device V1, V2 may in this case be hydraulically or else electromechanically formed, wherein at least one cushion that can be filled with a gas or liquid and/or one or more clamping jaws are provided, which cushion and/or jaws expand in the workpiece and press against the walling of the workpiece during the clamping operation until clamping of the device in the hollow-cylindrical workpiece W, and in particular in the pipe or the line of a nuclear plant or reactor system, has been brought about.

As can be seen from FIG. 1, a first clamping device V1 is in this case rigidly connected to the first drive means A1 and a further, second clamping device V2 is connected rotationally movably to the shaft AW1 of the first drive means A1 and/or rotationally movably to the first drive means and/or the second drive means, in particular via a rotary bearing DL and a shaft or spindle.

In the longitudinal direction or axial direction of the erosion device, the two clamping devices V1, V2 and also the drive means A1, A2 and the erosion electrode are consequently frictionally connected or coupled to one another.

The erosion device shown in FIG. 2 accordingly likewise comprises at least two elongated drive means A1, A2, wherein at least a first drive means A1 is in operative connection in a rotatable and/or pivotable manner with at least one second drive means A2 via a first drive shaft AW1, and an erosion electrode E formed in the manner of a ring or disc is provided, which electrode is in operative connection in a rotatable and/or pivotable manner with the at least one second drive means A2 via a second drive shaft AW2, wherein the first and second drive means A1, A2 are arranged radially offset in relation to one another and the erosion electrode E is eccentrically connected to the second drive shaft AW2 and/or arranged thereon, and wherein the drive means A1, A2 and the electrode E interact in such a way that the electrode E can be pivoted into the workpiece W to be machined and can be moved, in particular can be rotationally moved, through the workpiece, and in particular the material of the shell or wall thereof, on a virtually circular path.

By means of the aforementioned device, the corresponding region is separated or cut out from the respective hollow-cylindrical workpiece W, here a pipe or a line of a nuclear plant. For this, the erosion device is brought or moved to the corresponding region to be machined through the pipe. In order to then be able to carry out the machining and/or separating process dependably and avoid, or at least minimize, process- or machining-dependent deformation of and/or damage to the respective region of the pipe or line, the erosion device is clamped in the pipe or in the line by means of two clamping devices V1, V2 at at least two locations.

For carrying out the EDM process, a dielectric, in this case fully or virtually fully demineralized water, is introduced, transporting away the machining particles, that is to say the material of the wall that has been removed from the walling of the workpiece, and the associated particles, and/or at the same time removing the heat produced during the erosion process.

In terms of the method, it is made possible by means of the erosion device designed according to the present disclosure and introduced into a hollow-cylindrical workpiece for the electrode E to be pivoted into the workpiece W by a second drive means A2, located outside the centre axis of the pipe, and it is made possible by means of a first drive means A1, the axis of rotation of which lies centrally in relation to the workpiece axis, in particular pipe axis, for a rotating movement of the electrode by 360°, and consequently a complete circumferential cut, to be performed in the workpiece to be machined.

For controlling and monitoring both the erosion process and/or separating process and in particular the drive means A1, A2 respectively used, a drive device is provided, which device interacts with various measuring devices and sensor arrangements and/or makes possible and allows a remote or distant control of the erosion device and also of the actual erosion process via interfaces and operating elements provided for this.

The drive of both the drive shafts AW1, AW2 of the drive devices A1, A2 or drive means must take place in a controlled manner, in order to be able to carry out the machining process in a monitored and exact manner, which can be brought about for example by stepping motors and corresponding step-down gear mechanisms.

The determination and evaluation of the angular positions and movement control of the drive means and of the drive shafts and also of the electrode is carried out by means of measuring devices known per se—with measuring means, such as rotary transducers or angular position transducers, such as for example encoders, resolvers, potentiometer pickoffs, incremental encoders, absolute encoders, tachometers, which are arranged at a suitable position on the drive means.

For the processing of the information and data provided, the control device comprises at least one data-processing device with a data memory. It may advantageously be provided that the various items of information and measurement data read in are logged and recorded in a time-resolved manner during the performance of the method.

In terms of the method and in terms of the device, the two drive units or drive means A1, A2 and shafts AW1, AW2 may in this case be activated independently and differently from one another, whereby quite different machining steps and cuts can be brought about. The following cutting possibilities are obtained here:

1. A complete plunge cut through the walling of the pipe and then the subsequent axial circumferential cut;
2. An axial cut with an infeed in the radial direction, wherein the radial infeed can take place or can be carried out here continuously, so that the cutting line in this case ultimately resembles a spiral;
3. It may, however, also only take place on the basis of certain angles, wherein a complete circumferential cut, such as for example an angular cut of 360°, is always carried out with the same external diameter and only then is the depth of the plunge cut made greater, so that the removal takes place essentially by layers or in multiple layers;
4. As under item 1, it may first take place completely in the radial direction, wherein a moving-out operation, a turning in the axial direction and then again a plunge cut take place, or are carried out, as before.

Combinations of all the possibilities mentioned can also be realized and brought about. Such as for example a complete plunge cut and then a following spiral cut.

The identification and detection of the complete through-cut may be carried out or take place in the following ways:

1. In the case of the known burning away, the depth of the plunge cut, which is a function of the angle of rotation and electrode size, or in the case of ring or disc electrodes the electrode radius or diameter, is determined by the angle of rotation, which can take place by suitable measuring means on the respective drive means A1, A2. At the axis of rotation D2 there is likewise a measuring means, for example a rotary transducer, with the aid of which the angular position can be determined. Consequently, this erosion method works together with the measuring means at the two axes of rotation,
2. by a measuring method such as ultrasound or eddy current,
3. by the change in frequency of the workpiece when the through-cut takes place,
4. by an imaging method, such as for example with the aid of an endoscope,
5. by the erosion parameters, since for example the current flow changes here when there is a successful through-cut.

Once it is ensured that the pipe has been successfully cut through, the clamping devices V1 and V2 of the erosion device are detached, the water supply or supply of dielectric is switched off and the device is removed again from the pipe. This therefore takes place in the reverse sequence from the installation.

The present invention also encourages any desired combinations of exemplary embodiments and individual refinement features or developments, as long as they are not mutually exclusive.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An erosion device for machining a hollow-cylindrical workpiece, which device is elongated and/or formed in the manner of a tube or cylinder, comprising:
    at least first and second means for rotationally driving, each with a drive shaft;
    an erosion electrode, configured to be rotationally driven by the at least first and second means for rotationally driving and formed in the manner of a ring or disc, wherein the at least first and second means for rotationally driving and/or axes of symmetry or axes of rotation thereof are arranged radially or laterally offset in relation to one another and the second means for rotationally driving is connected eccentrically and frictionally to the drive shaft of the first means for rotationally driving and/or is arranged thereon and/or coupled thereto, and the erosion electrode is eccentrically and frictionally connected to the drive shaft of the second means for rotationally driving and arranged thereon and/or coupled thereto such that the second means for rotationally driving is configured to rotate the erosion electrode;
    wherein the at least first and second means for rotationally driving and the erosion electrode are adapted in size and extent to an internal diameter of a hollow-cylindrical workpiece to be machined, so that the device can be introduced into the workpiece and can be positioned at a location to be machined or a region to be machined in the workpiece;
    wherein the erosion electrode is configured to be pivoted or to be rotated by the drive shafts of the at least first and second means for rotationally driving, into material of a wall of a workpiece and to be moved through or along the workpiece and/or the material of the wall of the workpiece on a predeterminable machining path which follows an inner and/or outer contour of the workpiece, so that removal of material and/or cut in material of the wall of the workpiece can be performed by Electrical Discharge Machining; and
    at least two clamping devices arranged on both sides, in a longitudinal direction, of the erosion electrode, and of a specific machining region, with which the at least first and second means for rotationally driving with the erosion electrode, are kept immovably fixed in the workpiece in the longitudinal direction or axial direction and by being clamped thereto, so that deforming of the workpiece by machining, and consequent jamming of the erosion electrode during an erosion operation end phase can be avoided to provide separating.

2. The erosion device according to claim 1, wherein diameters of the at least first and second means for rotationally driving and of the erosion electrode are configured to a clear width and/or internal diameter of a hollow-cylindrical workpiece to be machined.

3. The erosion device according to claim 1, wherein at least one means for rotationally driving is formed as an electromechanical servo drive and/or rotary drive, or as a hydraulic drive or as a pneumatic drive.

4. The erosion device according to claim 1, wherein dimensions of the at least first and second means for rotationally driving and of the erosion electrode are adapted to one another and to a specified hollow-cylindrical workpiece, and to an internal diameter or clear width thereof, in such a way that the erosion device will be smoothly inserted into the hollow-cylindrical workpiece even when configured as a pipe or a line, for movement therein, and displacement and/or positioning at a location to be machined.

5. The erosion device according to claim 1, comprising:
    a control device, with which Electrical Discharge Machining can be controlled and monitored, wherein the Electrical Discharge Machining, and machining and/or separating of a hollow-cylindrical workpiece, even when configured as a pipe or a line, will be carried out from inside to the outside.

6. The erosion device according to claim 1, comprising:
    at least one measuring or sensor arrangement, by which progression of machining or separating, and successful through-cut, will be sensed, wherein the sensing is performed:
    using Electrical Discharge Machining parameters selected from a group consisting of current, voltage, removal rate, material pairing of the electrode/workpiece, nature of a dielectric used; and/or
    purely visually by an optical monitoring device; and/or
    by changing of a natural frequency of the workpiece; and/or
    by an eddy current method.

7. The erosion device according to claim 2, wherein at least one means for rotationally driving is formed as an electromechanical servo drive and/or rotary drive, or as a hydraulic drive or as a pneumatic drive.

8. The erosion device according to claim 7, wherein dimensions of the means for rotationally driving and of the erosion electrode are adapted to one another and to a specified hollow-cylindrical workpiece, and to an internal diameter or clear width thereof, in such a way that the erosion device will be smoothly inserted into the hollow-cylindrical workpiece even when configured as a pipe or a line, for movement therein, and displacement and/or positioning at a location to be machined.

9. The erosion device according to claim 1, comprising:
    a control device, with which Electrical Discharge Machining can be controlled and monitored, wherein the Electrical Discharge Machining, and machining and/or separating of a hollow-cylindrical workpiece, even when configured as a pipe or a line, will be carried out from inside to the outside.

10. The erosion device according to claim 9, comprising:
    at least one measuring or sensor arrangement, by which progression of machining or separating, and successful through-cut, will be sensed, wherein the sensing is performed:
    using Electrical Discharge Machining parameters selected from a group consisting of current, voltage, removal rate, material pairing of the electrode/workpiece, nature of a dielectric used; and/or
    purely visually by an optical monitoring device; and/or by changing of a natural frequency of the workpiece; and/or
by an eddy current method.

* * * * *